United States Patent
Kim

(10) Patent No.: US 7,585,362 B2
(45) Date of Patent: Sep. 8, 2009

(54) INK COMPOSITION, INK SET INCLUDING THE COMPOSITION, CARTRIDGE INCLUDING THE INK SET, AND INKJET RECORDING APPARATUS INCLUDING THE CARTRIDGE

(75) Inventor: In-hye Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/176,548

(22) Filed: Jul. 21, 2008

(65) Prior Publication Data

US 2009/0031920 A1 Feb. 5, 2009

(30) Foreign Application Priority Data

Aug. 3, 2007 (KR) .................. 10-2007-0078184

(51) Int. Cl.
*C09D 11/02* (2006.01)

(52) U.S. Cl. .............. 106/31.58; 106/31.43; 106/31.75; 106/31.86

(58) Field of Classification Search .............. 106/31.27, 106/31.43, 31.58, 31.6, 31.75, 31.86; 347/100
See application file for complete search history.

(56) References Cited

U.S. PATENT DOCUMENTS

| | | | | |
|---|---|---|---|---|
| 4,012,334 | A * | 3/1977 | Raleigh et al. | 516/119 |
| 5,486,549 | A * | 1/1996 | Itagaki et al. | 106/31.58 |
| 5,877,235 | A * | 3/1999 | Sakuma et al. | 106/31.58 |
| 6,113,680 | A * | 9/2000 | Aoyama et al. | 106/31.86 |
| 6,528,557 | B2 * | 3/2003 | Lin | 523/160 |
| 6,858,663 | B2 * | 2/2005 | Knott et al. | 106/31.6 |
| 7,053,166 | B2 * | 5/2006 | Brehm et al. | 528/14 |
| 7,452,413 | B2 * | 11/2008 | Kim et al. | 106/31.43 |
| 7,452,414 | B1 * | 11/2008 | Jung et al. | 347/100 |
| 2003/0079644 | A1 * | 5/2003 | Smith et al. | 106/31.43 |
| 2006/0023044 | A1 * | 2/2006 | Bauer | 347/100 |
| 2007/0296785 | A1 * | 12/2007 | Lee et al. | 106/31.58 |

FOREIGN PATENT DOCUMENTS

JP 3078184 6/2000

* cited by examiner

*Primary Examiner*—Helene Klemanski
(74) *Attorney, Agent, or Firm*—Stanzione & Kim LLP

(57) ABSTRACT

An ink composition including a siloxy group-containing silane-based compound, a colorant, and a solvent, and an ink cartridge and an inkjet recording apparatus including the ink composition.

14 Claims, 2 Drawing Sheets

INK COMPOSITION, INK SET INCLUDING THE COMPOSITION, CARTRIDGE INCLUDING THE INK SET, AND INKJET RECORDING APPARATUS INCLUDING THE CARTRIDGE

CROSS-REFERENCE TO RELATED APPLICATIONS

This application claims priority under 35 U.S.C. §119(a) from Korean Patent Application No. 10-2007-0078184, filed on Aug. 3, 2007, in the Korean Intellectual Property Office, the disclosure of which is incorporated herein in its entirety by reference.

BACKGROUND OF THE INVENTION

1. Field of the Invention

The present general inventive concept relates to an ink composition including a siloxy group-containing silane-based compound, a colorant, and a solvent, and an ink cartridge and an inkjet recording apparatus including the composition. More particularly, the present general inventive concept relates to an ink composition which, as a result of using a siloxy group-containing silane-based compound, prevents production of ink foam or bubbles in a cartridge when an inkjet printer is operated, induces a rapid elimination of foam or bubbles produced, exhibits a stable initial ink ejection behavior owing to good ink flowability, enhances durability characteristics, such as bleeding resistance to improve the quality of printed images, and prevents nozzle clogging, and an ink cartridge and an inkjet recording apparatus including the composition.

2. Description of the Related Art

Recently, with an increase in need/demand for coloration of hard copies in the field of image processing, etc., various methods of producing color hard copies have been developed. Examples of these methods include dye-sublimation recording, thermal wax transfer recording, inkjet recording, electrophotographic recording, and thermally processed silver recording.

In inkjet printing, ink droplets are ejected from nozzles of a recording head of an inkjet printer onto a recording medium, such as a paper. The ejected droplets form points called "dots" to create characters and images. The advantages of inkjet printing over other printing methods are its low cost, high quality, and ability to easily produce color images.

Thus, inkjet printers capable of simply printing at homes and offices have been widely been used. Inkjet printers that can provide image quality comparable to silver images have also been developed.

Ink used in inkjet printing is prepared by dissolving or dispersing a water-soluble dye or pigment into a solvent including water and a water-soluble organic solvent. If necessary, an additive, such as a surfactant, may be added.

In order to accomplish good inkjet recording for a long time, water-based ink for inkjet printing must satisfy the following requirements: characteristics such as viscosity, surface tension, and density, should have appropriate values, nozzle clogging in an inkjet recording apparatus, precipitate formation due to heat or the like, and a change in physical property values should not occur, and recorded images should have excellent water-repellency and light fastness.

When a large amount of ink is stored in a large capacity ink reservoir used in an inkjet system for a long time, foam or bubbles may be produced in the ink. Furthermore, when air is dissolved in ink, ink may produce foam or bubbles. In addition, when an ink circulation system is incorporated in a print cartridge, foam or bubbles may be produced in the print cartridge. The foam or bubbles must be easily removed from ink or be prevented from being produced. Thus, it is necessary to enhance the defoaming or antifoaming property of ink.

However, in conventional ink compositions, foam or bubbles are easily produced due to a surfactant used as a component of ink, and thus, the requirements of an ink composition are not satisfied.

In view of this problem, Japanese Patent No. 3,078,184 discloses addition of a fluorine- or silicon-based polymer to ink.

However, such a polymer is poorly soluble in ink, and thus, it is necessary to use a solvent that can disperse or dissolve the polymer. Moreover, such a solvent and polymer have poor miscibility with standard water-soluble additives forming ink. Thus, layer separation and solidification easily occur in the ink, and when the ink is not used for a long time, the silicon polymer and the ink are rapidly dried, thereby rapidly increasing the viscosity of the ink, resulting in nozzle clogging due to ink hardened at a surface of a nozzle of a printhead.

An ink composition and related technology capable of preventing the production of ink foam or bubbles in a cartridge, rapidly eliminating foam or bubbles produced, exhibiting a stable initial ejection behavior, enhancing durability characteristics, such as bleeding resistance, to improve the quality of printed images, and preventing nozzle clogging has not yet been provided.

SUMMARY OF THE INVENTION

The present general inventive concept provides an ink composition which prevents the production of ink foam or bubbles in a cartridge when an inkjet printer is operated, induces a rapid elimination of foam or bubbles produced, exhibits a stable initial ink ejection behavior owing to good ink flowability, enhances durability characteristics, such as bleeding resistance, to improve the quality of printed images, and prevents nozzle clogging.

The present general inventive concept also provides an ink set including two or more kinds of the ink composition.

The present general inventive concept also provides a cartridge for an inkjet recording apparatus, including the ink set.

The present general inventive concept also provides an inkjet recording apparatus including the cartridge.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an ink composition, including a siloxy group-containing silane-based compound represented by Formula 1 below, a colorant, and a solvent:

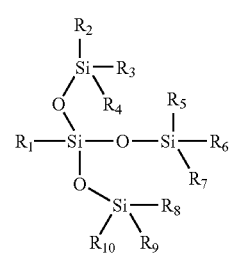

<Formula 1> wherein, $R_1$ through $R_{10}$ may each independently be hydrogen; a substituted or unsubstituted C1-C20 alkyl group; a substituted or unsubstituted C1-C20 heteroalkyl group; a substituted or unsubstituted C2-C20 alkenyl group; a substituted or unsubstituted C1-C20 alkoxy group; a —OSiR$_{11}$R$_{12}$R$_{13}$ siloxy group where R$_{11}$, R$_{12}$, and R$_{13}$ may each independently be hydrogen, a substituted or unsubstituted C1-C20 alkyl group, a substituted or unsubstituted C1-C20 heteroalkyl group, a substituted or unsubstituted C2-C20 alkenyl group, or a substituted or unsubstituted C1-C20 alkoxy group; a substituted or unsubstituted C1-C20 heteroalkoxy group; a substituted or unsubstituted C1-C20 alkylsulfonamide group; a substituted or unsubstituted C6-C20 arylsulfonamide group; a substituted or unsubstituted C1-C20 acylamino group; a C1-C20 alkylureido group; a C6-C20 arylureido group; a C2-C20 alkoxycarbonyl group; a C2-C20 alkoxycarbonylamino group; a carbamoyl group; a sulfamoyl group; a sulfo group or its salt; a carboxyl group or its salt; a substituted or unsubstituted C1-C20 hydroxyalkyloxyalkyl group; a substituted or unsubstituted C1-C20 dialkylaminoalkyl group; a substituted or unsubstituted C6-C20 pyridylalkyl group; a substituted or unsubstituted C5-C20 pyridyl group; a substituted or unsubstituted C6-C20 imidazolyl group; a hydrazine group; a hydrazone group; a substituted or unsubstituted C1-C20 pyridylalkyl group; a substituted or unsubstituted C6-C20 aryl group; a substituted or unsubstituted C6-C20 arylalkyl group; a substituted or unsubstituted C6-C20 heteroaryl group; a substituted or unsubstituted C6-C20 heteroarylalkyl group; a substituted or unsubstituted C6-C20 heteroaryloxy group; a substituted or unsubstituted C6-C20 heteroarylalkenyl group; a substituted or unsubstituted C3-C20 cycloalkyl group; or a substituted or unsubstituted C3-C20 heterocycloalkyl group.

The foregoing and/or other aspects and utilities of the present general inventive concept may also be achieved by providing an ink set including two or more kinds of the ink composition.

The foregoing and/or other aspects and utilities of the present general inventive concept may also be achieved by providing a cartridge for an inkjet recording apparatus, including the ink set.

The foregoing and/or other aspects and utilities of the present general inventive concept may also be achieved by providing an inkjet recording apparatus including the cartridge.

The foregoing and/or other aspects and utilities of the present general inventive concept may also be achieved by providing an ink composition, including a siloxy group-containing silane-based compound, a colorant, and a solvent, wherein the silane-based compound has an overall radial structure and comprises Si groups in a regular tetrahedral structure therein.

The foregoing and/or other aspects and utilities of the present general inventive concept may also be achieved by providing a method of preventing or eliminating bubbles in an ink composition, the method including adding an effective amount of a siloxy group-containing silane-based compound to the ink composition as a component of the ink composition.

The effective amount of the siloxy group-containing silane-based compound may be about 0.005 to 5 parts by weight based on 100 parts by weight of the ink composition.

According to the present general inventive concept, as a result of using a siloxy group-containing silane-based compound, it is possible to provide an ink composition which prevents the production of ink foam or bubbles in a cartridge when an inkjet printer is operated, induces the rapid elimination of foam or bubbles produced, and exhibits a stable initial ink ejection behavior owing to good ink flowability and good long-term storage stability.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
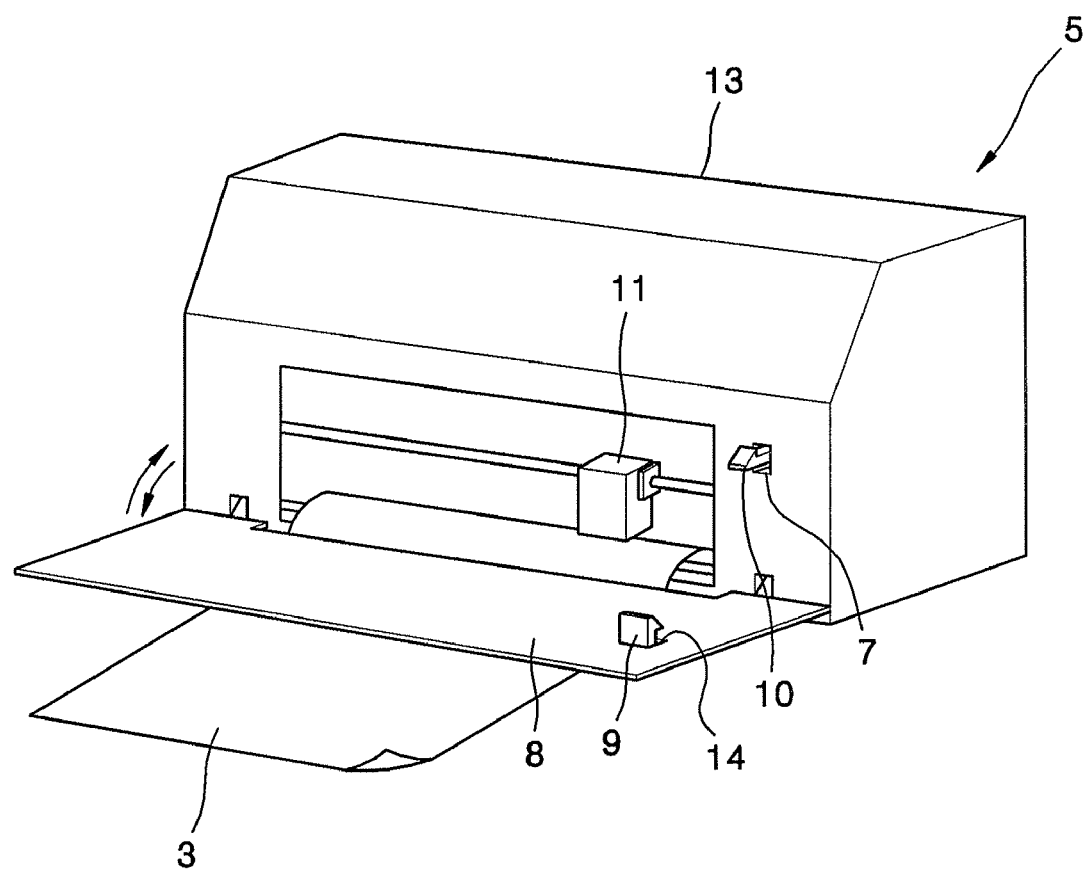
FIG. 1 is a perspective view illustrating an inkjet recording apparatus including an ink cartridge according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

The present general inventive concept provides an ink composition including a siloxy group-containing silane-based compound represented by Formula 1 below, a colorant, and a solvent:

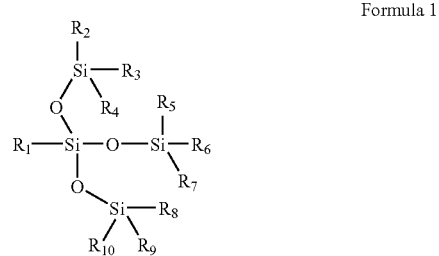

Formula 1 wherein, R$_1$ through R$_{10}$ can each independently be hydrogen; a substituted or unsubstituted C1-C20 alkyl group; a substituted or unsubstituted C1-C20 heteroalkyl group; a substituted or unsubstituted C2-C20 alkenyl group; a substituted or unsubstituted C1-C20 alkoxy group; a —OSiR$_{11}$R$_{12}$R$_{13}$ siloxy group where R$_{11}$, R$_{12}$, and R$_{13}$ can each independently be hydrogen, a substituted or unsubstituted C1-C20 alkyl group, a substituted or unsubstituted C1-C20 heteroalkyl group, a substituted or unsubstituted C2-C20 alkenyl group, or a substituted or unsubstituted C1-C20 alkoxy group; a substituted or unsubstituted C1-C20 heteroalkoxy group; a substituted or unsubstituted C1-C20 alkylsulfonamide group; a substituted or unsubstituted C6-C20 arylsulfonamide group; a substituted or unsubstituted C1-C20 acylamino group; a C1-C20 alkylureido group; a C6-C20 arylureido group; a C2-C20 alkoxycarbonyl group; a C2-C20 alkoxycarbonylamino group; a carbamoyl group; a sulfamoyl group; a sulfo group or its salt; a carboxyl group or its salt; a substituted or unsubstituted C1-C20 hydroxyalkyloxyalkyl group; a substituted or unsubstituted C1-C20 dialkylaminoalkyl group; a substituted or unsubstituted C6-C20 pyridylalkyl group; a substituted or unsubstituted C5-C20 pyridyl group; a substituted or unsubstituted C6-C20 imidazolyl group; a hydrazine group; a hydrazone group; a substituted or unsubstituted C1-C20 pyridylalkyl group; a substituted or unsubstituted C6-C20 aryl group; a substituted or unsubstituted C6-C20 arylalkyl group; a substituted or unsubstituted C6-C20 heteroaryl group; a substituted or unsubstituted C6-C20 heteroarylalkyl group; a substituted or unsubstituted C6-C20 heteroaryloxy group; a substituted or unsubstituted C6-C20 heteroarylalkenyl group; a substituted or unsubstituted C3-C20 cycloalkyl group; or a substituted or unsubstituted C3-C20 heterocycloalkyl group.

According to the ink composition including the siloxy group-containing silane-based compound of Formula 1 of the present general inventive concept, owing to the presence of Si groups with a regular tetrahederal structure, foam membranes stabilized in ink can be easily broken. Further, since the compound wholly has a radial structure, when ink is printed onto a paper, the ink can deeply permeate the paper due to a strong bond between the ink and a cellulose component of the paper.

As a result, air bubbles are not easily produced during ink flow, produced air bubbles can be rapidly eliminated, and deep penetration of a colorant contained in ink into a paper is prevented, thereby maintaining a high color concentration (optical density (OD)). Moreover, since a silane-based compound having a radial structure is present on a surface of a paper, and an oxygen atom (—O—) having a nonbonding electron is present in the silane-based compound, due to large hydrogen bond interactions between a colorant and the oxygen atom, the colorant can be fixed on the surface of the paper. Therefore, the mobility of the colorant on the surface of the paper is reduced, thereby enhancing durability characteristics, such as abrasion resistance and bleeding resistance.

The siloxy group-containing silane-based compound of Formula 1 that can be used in the ink composition of the present general inventive concept may be tris(trimethylsiloxy)silane represented by Formula 2 below, tris(triethylsiloxy)silane) represented by Formula 3 below, tris(trimethylsiloxy)(vinyl)silane represented by Formula 4 below, (3-aminopropyl)tris(trimethylsiloxy)silane represented by Formula 5 below, 3-[tris(trimethylsiloxy)silyl]propyl methacrylate represented by Formula 6 below, phenyl-tris(trimethylsiloxy)silane represented by Formula 7 below, tris(dimethylsiloxy)phenylsilane represented by Formula 8 below, tetrakis(dimethylsiloxy)silane represented by Formula 9 below, or a mixture thereof, but is not limited thereto:

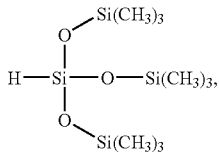
<Formula 2>

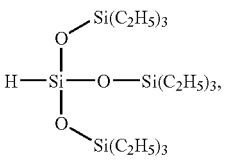
<Formula 3>

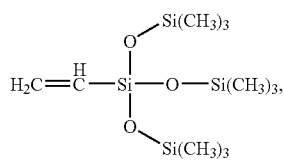
<Formula 4>

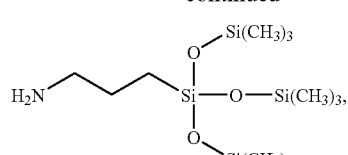
<Formula 5>

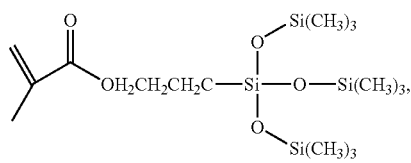
<Formula 6>

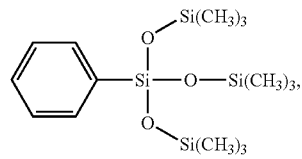
<Formula 7>

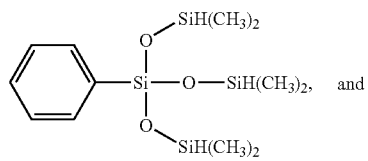
<Formula 8>

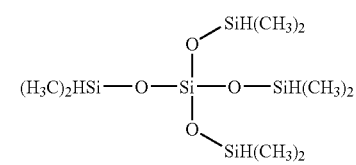
<Formula 9>

In the ink composition of the present general inventive concept, a content of the siloxy group-containing silane-based compound of Formula 1 may be about 0.005 to 5 parts by weight, preferably 0.5 to 4 parts by weight, more preferably 1 to 3 parts by weight, based on 100 parts by weight of the ink composition.

If the content of the siloxy group-containing silane-based compound of Formula 1 is less than 0.05 parts by weight, the antifoaming/defoaming effect of inkjet ink may be insufficient, and the performance of initial introduction of the ink into an ink channel may be unsatisfactory. On the other hand, if the content of the siloxy group-containing silane-based compound exceeds 5 parts by weight, the degree of penetration of the ink into a recording paper may be too high so that the ink blotches the back side of the recording paper, ink bleeding may occur, and an abnormal phenomenon, such as extreme ink wetting around a nozzle, may occur, thereby rendering stable ejection of the ink difficult.

Both a dye and a pigment can be used as the colorant of the ink composition according to the present general inventive concept, and the colorant is not limited provided that it is used in the art. That is, the colorant may be selected from direct dyes, acid dyes, foodstuff dyes, basic dyes, reactive dyes, disperse dyes, oil dyes, self-dispersible pigments, capsulated pigments, and mixtures thereof.

Examples of dyes that can be used as the colorant include, but are not limited to, food black dyes, food red dyes, food yellow dyes, food blue dyes, acid black dyes, acid red dyes, acid blue dyes, acid yellow dyes, direct black dyes, direct blue dyes, direct yellow dyes, cyan dyes, anthraquinone dyes, monoazo dyes, disazo dyes, and phthalocyanine derivatives, and examples of pigments that can be used as the colorant include, but are not limited to, carbon black, graphite, vitreous carbon, activated charcoal, activated carbon, anthraquinone, phthalocyanine blue, phthalocyanine green, diazos, monoazos, pyranthrones, perylene, quinacridone, and indigoid pigments. The self-dispersible pigment may be cabojet-series or CW-series (Orient Chemical), but is not limited thereto.

The colorant may be used in an amount of 0.5 to 15 parts by weight, preferably 1 to 7 parts by weight, more preferably 3 to 5 parts by weight, based on 100 parts by weight of the ink composition. If the content of the colorant is less than 0.5 parts by weight, sufficient coloration may not be achieved. On the other hand, if the content of the colorant exceeds 15 parts by weight, the solubility of the colorant may be lowered.

The solvent used in the ink composition according to the present general inventive concept may be an aqueous solvent, such as water. The aqueous solvent may be used in combination with at least one organic solvent. The solvent may be used in an amount of 80 to 99 parts by weight, preferably, more preferably 85 to 95 parts by weight, based on 100 parts by weight of the ink composition.

If the content of the solvent is less than 80 parts by weight, the viscosity of the ink composition may be excessively increased, thereby lowering the performance of ink ejection. On the other hand, if the content of the solvent exceeds 99 parts by weight, the surface tension of ink may be increased, thereby lowering the performance of ink ejection.

The organic solvent used herein may be at least one selected from a group consisting of monohydric alcohol-based solvents, ketone-based solvents, ester-based solvents, polyhydric alcohol-based solvents, nitrogen-containing solvents, and sulfur-containing compounds (dimethyl sulfoxide, tetramethylsulfone, or thioglycol).

The monohydric alcohol-based solvents that can be used as the organic solvent may be methylalcohol, ethylalcohol, n-propylalcohol, isopropylalcohol, n-butylalcohol, sec-butylalcohol, t-butylalcohol, or isobutylalcohol, the ketone-based solvents may be acetone, methylethylketone, diethylketone, or diacetonealcohol, the ester-based solvents may be methyl acetate, ethyl acetate, or ethyl lactate, and the polyhydric alcohol-based solvents may be ethyleneglycol, diethyleneglycol, triethyleneglycol, propyleneglycol, butyleneglycol, 1,4-butanediol, 1,2,4-butanetriol, 1,5-pentanediol, 1,2,6-hexanetriol, hexyleneglycol, glycerol, glycerol ethoxylate, or trimethylolpropane ethoxylate. The monohydric alcohol-based solvents that can be used as the organic solvent can adjust the surface tension of ink, thereby enhancing ink permeability, dot formability, and dry characteristics of printed images on a recording medium, such as a general paper or a special paper. The polyhydric alcohol-based or its derivative solvents are not easily evaporated and lower the freezing point of ink, thereby enhancing the storage stability of the ink, resulting in prevention of nozzle clogging.

The nitrogen-containing solvents that can be used as the organic solvent may be 2-pyrrolidone or N-methyl-2-pyrrolidone, and the sulfur-containing solvents that can be used as the organic solvent may be dimethyl sulfoxide, tetramethylenesulfone, or thioglycol.

When the organic solvent is used in combination with the aqueous solvent, such as water, a content of the organic solvent may be 0.1 to 130 parts by weight, preferably 10 to 50 parts by weight, based on 100 parts by weight of water. If the content of the organic solvent is less than 0.1 parts by weight, the surface tension of ink may be excessively increased. On the other hand, if the content of the organic solvent exceeds 130 parts by weight, the viscosity of ink may be increased, thereby lowering the performance of ink ejection.

The ink composition according to the present general inventive concept may include various additives in order to reinforce characteristics of the ink composition. Specifically, the ink composition may further include at least one additive selected from a group consisting of a wetting agent, a dispersant, a surfactant, a viscosity modifier, a pH adjustor, and an antioxidant. The content of the additive may be 0.5 to 600 parts by weight, preferably 10 to 300 parts by weight, based on 100 parts by weight of the colorant. If the content of the additive is less than 0.5 parts by weight, it may be difficult to realize the performance of ink. On the other hand, if the content of the additive exceeds 600 parts by weight, the storage stability of ink may be lowered.

In particular, the surfactant used as the additive is not particularly limited and can be appropriately selected according to the purpose of use. For example, the surfactant may be an amphoteric surfactant, an anionic surfactant, a cationic surfactant, a nonionic surfactant, etc. These surfactants may be used alone or in combination of two or more.

The amphoteric surfactant may be alanine, dodecyldi(aminoethyl)glycine, di(octylaminoethyl)glycine, N-alkyl-N,N-dimethylammoniumbetaine, etc.

The anionic surfactant may be alkylbenzenesulfonate, α-olefinsulfonate, polyoxyethylenealkyletheracetate, phosphate ester, etc.

The cationic surfactant may be an amine salt surfactant, such as an alkylamine salt, an aminoalcoholfatty acid derivative, a polyaminefatty acid derivative, or imidazoline; a quaternary ammonium salt surfactant, such as an alkyltrimethylammonium salt, a dialkyldimethylammonium salt, an alkyldimethylbenzylammonium salt, a pyridinium salt, an alkylisoquinolinum salt, or a chlorinated benzetonium salt.

The nonionic surfactant may be a polyoxyethylenealkylether surfactant, a polyoxyethylenealkylphenylether surfactant, an acetyleneglycol surfactant, etc.

The nonionic surfactant may be preferred owing to its good antifoaming/defoaming property.

Preferably, the nonionic surfactant may be SURFYNOL series (Air Products) having an acetylenic ethoxylated diol structure, TERGITOL series (Union Carbide) having a polyethylene oxide or polypropylene oxide structure, Tween series having a polyoxyethylene sorbitan fatty acid ester structure, etc.

The ink composition according to the present general inventive concept may have a surface tension of 15 to 70 dyne/cm, preferably 25 to 55 dyne/cm, at 20° C., and a viscosity of 1 to 20 cps, preferably 1.5 to 3.5 cps, at 20° C., in order to guarantee an optimal use of the ink composition. If the surface tension of the ink composition is outside the above range, the performance of printing may be lowered. If the viscosity of the ink composition is outside the above range, the ejection of ink may not be efficiently performed.

The present general inventive concept also provides an ink set including two or more different ink compositions according to the present general inventive concept. The ink set can be provided in an ink receiver or an inkjet printer cartridge of an inkjet recording apparatus. An inkjet recording apparatus according to the present general inventive concept may include a thermal head ejecting ink droplets using vapor pressure generated by heating an ink composition, a piezo head ejecting ink droplets using a piezo device, a disposable head, or a permanent head. The inkjet recording apparatus may be a scanning type printer or an array type printer. The inkjet recording apparatus can be used for desktop, textile, and industrial purpose. The types of heads and the types and applications of printers related to the inkjet recording apparatus according to the present general inventive concept are intended to only explain the inkjet recording apparatus of the present general inventive concept. An inkjet recording apparatus to which an ink composition according to the present general inventive concept can be applied is not limited to the above-described inkjet recording apparatus and can be selected from various inkjet recording apparatuses.

Substituents used in compounds according to the present general inventive concept can be defined as follows.

The term "alkyl group" used herein refers to a straight or branched, saturated monovalent hydrocarbon moiety having 1-20, preferably 1-10, more preferably 1-6 carbon atoms. Examples of an unsubstituted alkyl group used herein include methyl, ethyl, propyl, isobutyl, sec-butyl, tert-butyl, pentyl, iso-amyl, hexyl, etc. At least one hydrogen atom of the alkyl group may be substituted by a halogen atom, a hydroxyl group, a nitro group, a cyano group, a substituted or unsubstituted amino group ($-NH_2$, $-NH(R)$, or $-N(R')(R'')$ where R' and R" are each independently a C1-C10 alkyl group), an amidino group, hydrazine, hydrazone, a carboxyl group, a sulfonic acid group, a phosphoric acid group, a C1-C20 alkyl group, a halogenated C1-C20 alkyl group, a C1-C20 alkenyl group, an acryl group, a methacryl group, a C1-C20 alkynyl group, a C1-C20 heteroalkyl group, a C6-C20 aryl group, a C6-C20 arylalkyl group, a C6-C20 heteroaryl group, or a C6-C20 heteroarylalkyl group.

The term "heteroalkyl group" used herein refers to an alkyl group as defined above in which at least one carbon atom, preferably 1-5 carbon atoms, in the main chain is substituted by a heteroatom, e.g., an oxygen atom, a sulfur atom, a nitrogen atom, or a phosphorus atom.

The term "alkenyl group" used herein refers to a straight or branched monovalent hydrocarbon moiety having 2-20, preferably 2-10, more preferably 2-6 carbon atoms including at least one carbon-carbon double bond. The alkenyl group may be optionally substituted by at least one halogen substituent. For example, the alkenyl group may be ethenyl, 1-propenyl, 2-propenyl, 2-butenyl, 3-butenyl, pentenyl, 5-hexenyl, dodecenyl, etc.

The term "aryl group" used herein refers to a monovalent monocyclic, bicyclic, or tricyclic aromatic hydrocarbon moiety having 6-30, preferably 6-18 ring atoms. The aryl group may be optionally substituted by at least one halogen substituent. The aromatic moiety of the aryl group consists of carbon atoms. For example, the aryl group may be phenyl, naphthalenyl, or fluorenyl. At least one hydrogen atom of the aryl group may be substituted by a substituent as recited in the alkyl group.

The term "heteroaryl group" used herein refers to a cyclic aromatic system having 5 to 30-membered ring(s) including one, two, or three heteroatoms selected form N, O, P, and S. Two or more rings may be attached to each other as a pendant group or fused. At least one hydrogen atom of the heteroaryl group may be substituted by a substituent as recited in the alkyl group.

The term "alkoxy group" used herein refers to a radical $-O$-alkyl. Here, the alkyl is as defined above. For example, the alkoxy group may be methoxy, ethoxy, propoxy, isobutyloxy, sec-butyloxy, pentyloxy, iso-amyloxy, hexyloxy, etc. At least one hydrogen atom of the alkoxy group may be substituted by a substituent as recited in the alkyl group.

The term "heteroalkoxy group" used herein essentially refers to an alkoxy group as defined above except that at least one heteroatom, e.g., oxygen, sulfur, or nitrogen is present in an alkyl chain. For example, the heteroalkoxy group may be $CH_3CH_2OCH_2CH_2O-$, $C_4H_9OCH_2CH_2OCH_2CH_2O-$, $CH_3O(CH_2CH_2O)_nH$, or the like.

The term "arylalkyl group" used herein refers to an aryl group as defined above in which at least one hydrogen atom is substituted by a lower alkyl radical, e.g., methyl, ethyl, or propyl. For example, the arylalkyl group may be benzyl, phenylethyl, or the like. At least one hydrogen atom of the arylalkyl group may be substituted by a substituent as recited in the alkyl group.

The term "heteroarylalkyl group" used herein refers to a heteroaryl group in which at least one hydrogen atom is substituted by a lower alkyl group. The "heteroaryl" in the heteroarylalkyl group is as defined above. At least one hydrogen atom of the heteroarylalkyl group may be substituted by a substituent as recited in the alkyl group.

The term "aryloxy group" used herein refers to a radical $-O$-aryl. Here, the aryl is as defined above. For example, the aryloxy group may be phenoxy, naphthoxy, anthracenyloxy, phenanthrenyloxy, fluorenyloxy, indenyloxy, or the like. At least one hydrogen atom of the aryloxy group may be substituted by a substituent as recited in the alkyl group.

The term "heteroaryloxy group" used herein refers to a radical $-O$-heteroaryl. Here, the heteroaryl is as defined above. For example, the heteroaryloxy group may be benzyloxy, phenylethyloxy, or the like. At least one hydrogen atom of the heteroaryloxy group may be substituted by a substituent as recited in the alkyl group.

The term "cycloalkyl group" used herein refers to a monovalent monocyclic system having 5-30 carbon atoms. At least one hydrogen atom of the cycloalkyl group may be substituted by a substituent as recited in the alkyl group.

The term "heterocycloalkyl group" used herein refers to a monovalent monocyclic system having 5 to 30-membered ring(s) including one, two, or three heteroatoms selected from N, O, P, and S. At least one hydrogen atom of the heterocycloalkyl group may be substituted by a substituent as recited in the alkyl group.

FIG. 1 is a view illustrating an inkjet recording apparatus according to an embodiment of the present general inventive concept.

Referring to FIG. 1, the inkjet recording apparatus includes an inkjet printer cartridge 11 including an ink composition containing a macro-chromophore-containing colorant and a colorant-like additive. A printer cover 8 is connected to a main body 13 of a printer 5. An engaged portion of a movable latch 10 is protruded through a hole 7, and the movable latch 10 is engaged with a fixed latch 9. When the printer cover 8 is covered, the fixed latch 9 is connected to the moving latch within the inside of the printer cover. The printer cover 8 has a recess 14 corresponding to the latching portion of the movable latch 10 which is extended through the hole 7. The inkjet printer cartridge 11 is installed such that ink is ejected onto a paper 3 that passes through a lower portion of the inkjet printer cartridge 11.

Figure 2:
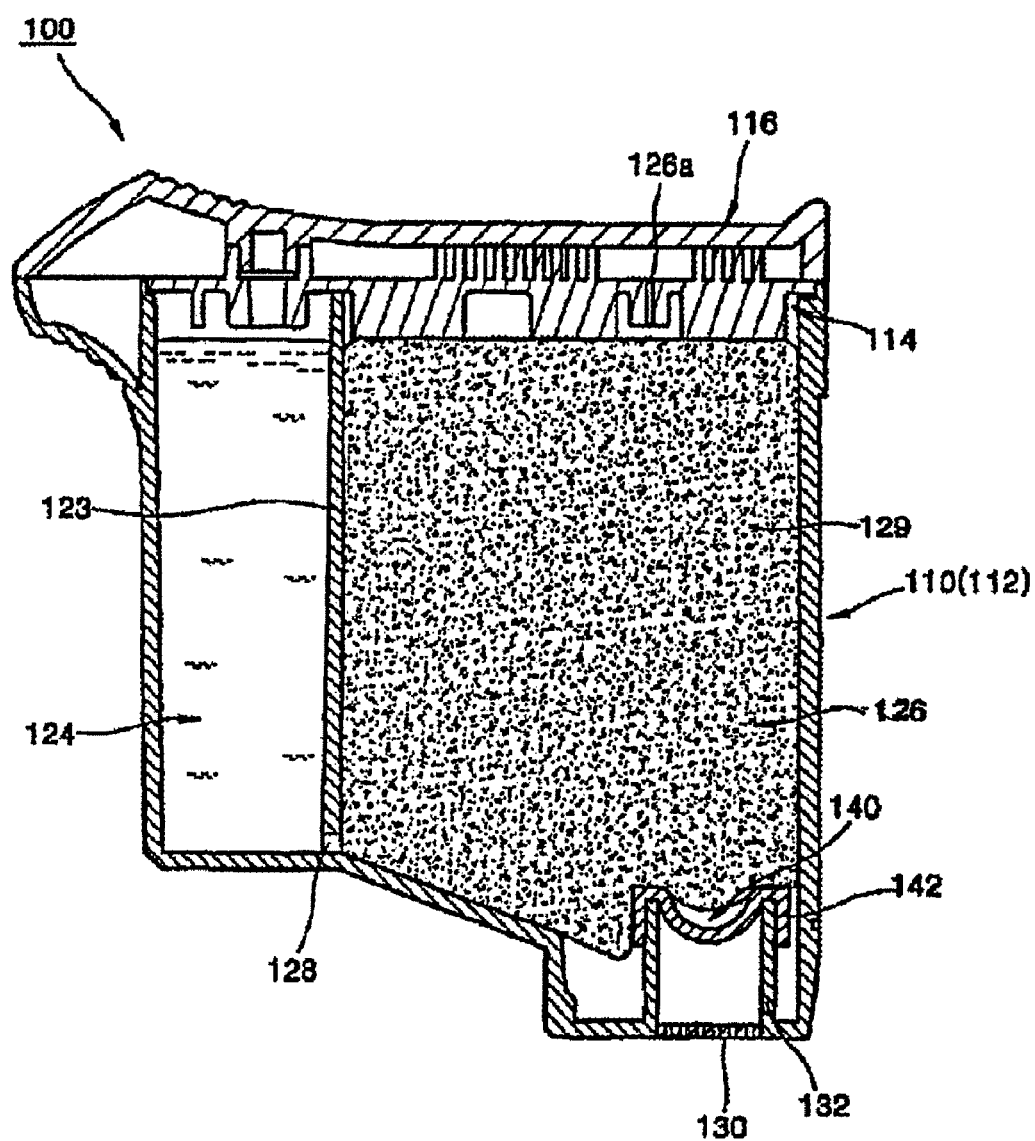
FIG. 2 is a sectional view illustrating an ink cartridge according to an embodiment of the present general inventive concept.

FIG. 2 is a sectional view illustrating an inkjet printer cartridge 100 including an ink set according to an embodiment of the present general inventive concept. Referring to FIG. 2, the inkjet printer cartridge 100 includes a cartridge main body 110 defining an ink reservoir 112, an inner cover 114 covering a top portion of the ink reservoir 112, and an outer cover 116 which is separated from the inner cover 114 by a predetermined distance and which seals the ink reservoir 112 and the inner cover 114.

The ink reservoir 112 is divided into a first chamber 124 and a second chamber 126 by a vertical barrier wall 123. An ink passage 128 is formed at a bottom of the vertical barrier wall 123 between the first chamber 124 and the second chamber 126. Ink is filled in the first chamber 124 and in a sponge 129, and then in the second chamber 126. A vent hole 126*a* is formed at the inner cover 114 corresponding to the second chamber 126.

A filter 140 is disposed at a bottom side of the second chamber 126 and filters impurities and fine bubbles in ink so as to prevent clogging of an ejection hole of a printhead 130. A hook 142 formed at an edge of the filter 140 is disposed (coupled) at a top portion of a standpipe 132. Ink of the ink reservoir 112 is ejected in the form of fine droplets onto a print medium via the ejection hole of the printhead 130.

Hereinafter, the present general inventive concept will be described more specifically with reference to the following examples. The following examples are only for illustrative purposes and are not intended to limit the scope of the present general inventive concept.

Preparation of Ink Compositions

Siloxy group-containing silane-based compounds, colorants, water, organic solvents, and additives were mixed according to the following composition ratios, and the reaction mixtures were sufficiently stirred in stirrers for 30 minutes or more to prepare uniform solutions. The uniform solutions were filtered with filters having a pore size of 0.45 μm to obtain ink compositions of Examples 1-4.

EXAMPLE 1

| | |
|---|---|
| DB-199 (Cyan dye, Eastwell) | 4 parts by weight |
| Glycerol | 4 parts by weight |
| Diethyleneglycol | 12 parts by weight |
| Ethyleneglycol | 5 parts by weight |
| Compound of Formula 2 | 1 part by weight |
| Water (deionized water) | 84 parts by weight |
| Nonionic surfactant (surfynol 465, Air Products and Chemicals, Inc.) | 1 part by weight |

EXAMPLE 2

| | |
|---|---|
| AY 23 (Yellow dye, Eastwell) | 4 parts by weight |
| Glycerol | 4 parts by weight |
| Diethyleneglycol | 12 parts by weight |
| Ethyleneglycol | 5 parts by weight |
| Compound of Formula 3 | 1 part by weight |
| Water (deionized water) | 84 parts by weight |
| Nonionic surfactant (surfynol 465, Air Products and Chemicals, Inc.) | 1 part by weight |

EXAMPLE 3

| | |
|---|---|
| Carbon black (Regal 330, Cabot) | 4 parts by weight |
| Glycerol | 4 parts by weight |
| Diethyleneglycol | 12 parts by weight |
| Ethyleneglycol | 5 parts by weight |
| Compound of Formula 4 | 1 part by weight |
| Water (deionized water) | 84 parts by weight |
| Nonionic surfactant (surfynol 465, Air Products and Chemicals, Inc) | 1 part by weight |

EXAMPLE 4

| | |
|---|---|
| C.I. Basic Black 2 (black dye, Aldrich) | 4 parts by weight |
| Glycerol | 4 parts by weight |
| Diethyleneglycol | 12 parts by weight |
| Ethyleneglycol | 5 parts by weight |
| Compound of Formula 5 | 1 part by weight |
| Water (deionized water) | 84 parts by weight |
| Nonionic surfactant (surfynol 465, Air Products and Chemicals, Inc) | 1 part by weight |

EXAMPLE 5

An ink composition was prepared under the same conditions as in Example 1 except that the content of the compound of Formula 2 was 0.05 parts by weight.

EXAMPLE 6

An ink composition was prepared under the same conditions as in Example 1 except that the content of the compound of Formula 2 was 0.5 parts by weight.

EXAMPLE 7

An ink composition was prepared under the same conditions as in Example 1 except that the content of the compound of Formula 2 was 2 parts by weight.

EXAMPLE 8

An ink composition was prepared under the same conditions as in Example 1 except that the content of the compound of Formula 2 was 3 parts by weight.

EXAMPLE 9

An ink composition was prepared under the same conditions as in Example 1 except that the content of the compound of Formula 2 was 5 parts by weight.

EXAMPLE 10

An ink composition was prepared under the same conditions as in Example 2 except that the content of the compound of Formula 3 was 0.05 parts by weight.

EXAMPLE 11

An ink composition was prepared under the same conditions as in Example 2 except that the content of the compound of Formula 3 was 0.5 parts by weight.

EXAMPLE 12

An ink composition was prepared under the same conditions as in Example 2 except that the content of the compound of Formula 3 was 2 parts by weight.

EXAMPLE 13

An ink composition was prepared under the same conditions as in Example 2 except that the content of the compound of Formula 3 was 3 parts by weight.

EXAMPLE 14

An ink composition was prepared under the same conditions as in Example 2 except that the content of the compound of Formula 3 was 5 parts by weight.

Comparative Example 1

An ink composition was prepared under the same conditions as in Example 1 except that the compound of Formula 2 was not used.

Comparative Example 2

An ink composition was prepared under the same conditions as in Example 2 except that the compound of Formula 3 was not used.

Comparative Example 3

An ink composition was prepared under the same conditions as in Example 3 except that the compound of Formula 4 was not used.

Comparative Example 4

An ink composition was prepared under the same conditions as in Example 4 except that the compound of Formula 5 was not used.

Comparative Example 5

An ink composition was prepared under the same conditions as in Example 3 except that dimethylpolysiloxane was used instead of the compound of Formula 4.

Comparative Example 6

An ink composition was prepared under the same conditions as in Example 1 except that the content of the compound of Formula 2 was 7 parts by weight.

Comparative Example 7

An ink composition was prepared under the same conditions as in Example 1 except that the content of the compound of Formula 2 was 10 parts by weight.

Comparative Example 8

An ink composition was prepared under the same conditions as in Example 2 except that the content of the compound of Formula 3 was 7 parts by weight.

Comparative Example 9

An ink composition was prepared under the same conditions as in Example 2 except that the content of the compound of Formula 3 was 10 parts by weight.

<Bleeding Test>

The ink compositions prepared in Examples 1-4 and Comparative Examples 1-5 were refilled in Samsung ink cartridges (C-60), and image samples consisting of single-colored characters with no background were printed using MJC-3300p (Samsung Electronics Co., Ltd.). Degree of bleeding of the image samples was evaluated based on degree of blurring of lines and degree of vividness of characters recorded by water-based ink as follows. The results are shown in Table 1 below:

○—little blurring occurred, vivid characters
□—slight blurring occurred, readable characters
X—blurring occurred, unreadable characters

TABLE 1

|  | Examples | | | | Comparative Examples | | | | |
| --- | --- | --- | --- | --- | --- | --- | --- | --- | --- |
| Section | 1 | 2 | 3 | 4 | 1 | 2 | 3 | 4 | 5 |
| Evaluation | ○ | ○ | ○ | ○ | Δ | Δ | X | Δ | Δ |

Table 1 shows that an ink composition including a siloxy group-containing silane-based compound according to the present general inventive concept has excellent bleeding resistance.

<Antifoaming/Defoaming Test>

In order to evaluate the degree of foaming in ink, the ink compositions prepared in Examples 1-4 and Comparative Examples 1-5 (about 5 ml each) were filled in vials and shaken with a stirring bar for five minutes. A foam height 30 seconds after the shaking to a foam height immediately after the shaking was calculated. The results are shown in Table 2 below:

H: foam height after 30 seconds/initial foam height*100 (%)
○: $0 \leq H \leq 20$
Δ: $20 < H \leq 50$
X: $50 < H$

TABLE 2

|  | Examples | | | | Comparative Examples | | | | |
| --- | --- | --- | --- | --- | --- | --- | --- | --- | --- |
| Section | 1 | 2 | 3 | 4 | 1 | 2 | 3 | 4 | 5 |
| Evaluation | ○ | ○ | ○ | ○ | X | Δ | Δ | X | Δ |

Table 2 shows that an ink composition including a siloxy group-containing silane-based compound according to the present general inventive concept has excellent antifoaming/defoaming property.

<Nozzle Clogging Test>

The ink compositions prepared in Examples 1-4 and Comparative Examples 1-5 were refilled in Samsung ink cartridges (C-60). Then, the cartridges were incubated in a state wherein nozzles were not sealed under room temperature/atmospheric pressure conditions for one month, and installed in Samsung printers. When printing, the number of nozzle cleaning required to allow normal printing was measured. The evaluation was made by the following criteria, and the results are shown in Table 3 below:

○: removal of clogging by less than three nozzle cleaning cycles

Δ: removal of clogging by 3-5 nozzle cleaning cycles

X: no removal of clogging by less than five nozzle cleaning cycles

TABLE 3

|         | Examples |   |   |   | Comparative Examples |   |   |   |   |
|---------|---|---|---|---|---|---|---|---|---|
| Section | 1 | 2 | 3 | 4 | 1 | 2 | 3 | 4 | 5 |
| Evaluation | ○ | Δ | ○ | ○ | ○ | ○ | Δ | ○ | X |

Referring to Table 3, even though an ink composition (Examples 1-4) according to the present general inventive concept includes a siloxy group-containing silane-based compound, no nozzle clogging occurs, like an ink composition including no siloxy group-containing silane-based compound (Comparative Examples 1-4). Meanwhile, with regards to the conventional ink including dimethylpolysiloxane (Comparative Example 5), it is shown that there is an excessive nozzle clogging which can not be recovered with 5 times or less of nozzle cleaning, thereby declining the storage stability.

<Evaluation of Characteristics of Ink According to a Change in Content of Siloxy Group-Containing Silzane-based Compound>

The antifoaming/defoaming, bleeding, and nozzle clogging tests were performed for the ink compositions prepared with varying the contents of the compounds of Formulae 2 and 3 which were siloxy group-containing silane-based compounds according to the present general inventive concept, and the results are presented in Tables 4 and 5 below. Here, the content of the compound in Tables 4 and 5 below is based on 100 parts by weight of the ink composition.

Referring to Tables 4 and 5, when the content of the compound of Formula 2 or 3 which was a siloxy group-containing silane-based compound of the present general inventive concept was 0.05 to 5 parts by weight based on 100 parts by weight of the ink composition, the ink composition exhibited excellent results in the antifoaming/defoaming, bleeding, and nozzle clogging tests. However, when the content of the compound of Formula 2 or 3 exceeds 5 parts by weight (i.e., 7 or 10 parts by weight), nozzle clogging or ink blurring occurred and it was difficult to read characters.

An ink composition according to the present general inventive concept includes a siloxy group-containing silane-based compound. Thus, the ink composition can prevent the production of ink foam or bubbles in a cartridge when an inkjet printer is operated, induce the rapid elimination of foam or bubbles produced, exhibit a stable initial ink ejection behavior owing to good ink flowability, enhance durability characteristics, such as bleeding resistance to improve the quality of printed images, and prevent nozzle clogging.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An ink composition, comprising:
   a siloxy group-containing silane-based compound represented by Formula 1 below;
   a colorant; and
   a solvent:

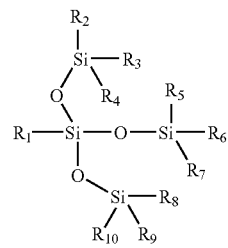

<Formula 1>

TABLE 4

|  | Exam. 5 | Exam. 6 | Exam. 1 | Exam. 7 | Exam. 8 | Exam. 9 | Comp. 6 | Comp. 7 |
|---|---|---|---|---|---|---|---|---|
| Content of compound of Formula 2 (parts by weight) | 0.05 | 0.5 | 1 | 2 | 3 | 5 | 7 | 10 |
| Antifoaming/defoaming test | Δ | Δ | ○ | ○ | ○ | ○ | ○ | Δ |
| Bleeding test | Δ | Δ | ○ | ○ | ○ | Δ | Δ | Δ |
| Nozzle clogging test | ○ | ○ | ○ | ○ | ○ | Δ | X | X |

Exam: Example
Comp.: Comparative Example

TABLE 5

|  | Exam. 10 | Exam. 11 | Exam. 2 | Exam. 12 | Exam. 13 | Exam. 14 | Comp. 8 | Comp. 9 |
|---|---|---|---|---|---|---|---|---|
| Content of compound of Formula 3 (parts by weight) | 0.05 | 0.5 | 1 | 2 | 3 | 5 | 7 | 10 |
| Antifoaming/defoaming test | □ | □ | ○ | ○ | ○ | ○ | □ | □ |
| Bleeding test | □ | □ | ○ | ○ | ○ | □ | □ | X |
| Nozzle clogging test | ○ | ○ | ○ | ○ | ○ | □ | X | X |

Exam: Example
Comp.: Comparative Example wherein, $R_1$ through $R_{10}$ are each independently hydrogen; a substituted or unsubstituted C1-C20 alkyl group; a substituted or unsubstituted C1-C20 heteroalkyl group; a substituted or unsubstituted C2-C20 alkenyl group; a substituted or unsubstituted C1-C20 alkoxy group; a —$OSiR_{11}R_{12}R_{13}$ siloxy group where $R_{11}$, $R_{12}$, and $R_{13}$ are each independently hydrogen, a substituted or unsubstituted C1-C20 alkyl group, a substituted or unsubstituted C1-C20 heteroalkyl group, a substituted or unsubstituted C2-C20 alkenyl group, or a substituted or unsubstituted C1-C20 alkoxy group; a substituted or unsubstituted C1-C20 heteroalkoxy group; a substituted or unsubstituted C1-C20 alkylsulfonamide group; a substituted or unsubstituted C6-C20 arylsulfonamide group; a substituted or unsubstituted C1-C20 acylamino group; a C1-C20 alkylureido group; a C6-C20 arylureido group; a C2-C20 alkoxycarbonyl group; a C2-C20 alkoxycarbonylamino group; a carbamoyl group; a sulfamoyl group; a sulfo group or its salt; a carboxyl group or its salt; a substituted or unsubstituted C1-C20 hydroxyalkyloxyalkyl group; a substituted or unsubstituted C1-C20 dialkylaminoalkyl group; a substituted or unsubstituted C6-C20 pyridylalkyl group; a substituted or unsubstituted C5-C20 pyridyl group; a substituted or unsubstituted C6-C20 imidazolyl group; a hydrazine group; a hydrazone group; a substituted or unsubstituted C1-C20 pyridylalkyl group; a substituted or unsubstituted C6-C20 aryl group; a substituted or unsubstituted C6-C20 arylalkyl group; a substituted or unsubstituted C6-C20 heteroaryl group; a substituted or unsubstituted C6-C20 heteroarylalkyl group; a substituted or unsubstituted C6-C20 heteroaryloxy group; a substituted or unsubstituted C6-C20 heteroarylalkenyl group; a substituted or unsubstituted C3-C20 cycloalkyl group; or a substituted or unsubstituted C3-C20 heterocycloalkyl group, and wherein the siloxy group-containing silane-based compound of Formula 1 is tris(trimethylsiloxy)silane represented by Formula 2 below, tris(triethylsiloxy)silane) represented by Formula 3 below, tris(trimethylsiloxy)(vinyl)silane represented by Formula 4 below, (3-aminopropyl)tris(trimethylsiloxy)silane represented by Formula 5 below, 3-[tris(trimethylsiloxy)silyl]propyl methacrylate represented by Formula 6 below, phenyltris(trimethylsiloxy)silane represented by Formula 7 below, tris(dimethylsiloxy)phenylsllane represented by Formula 8 below, tetrakis(dimethylsiloxy)silane represented by Formula 9 below, or a mixture thereof:

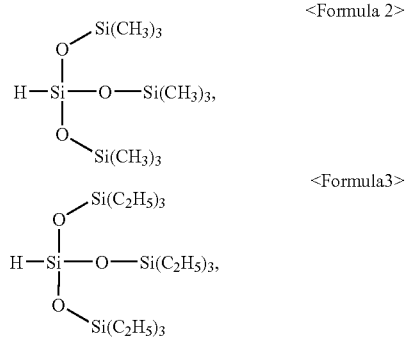

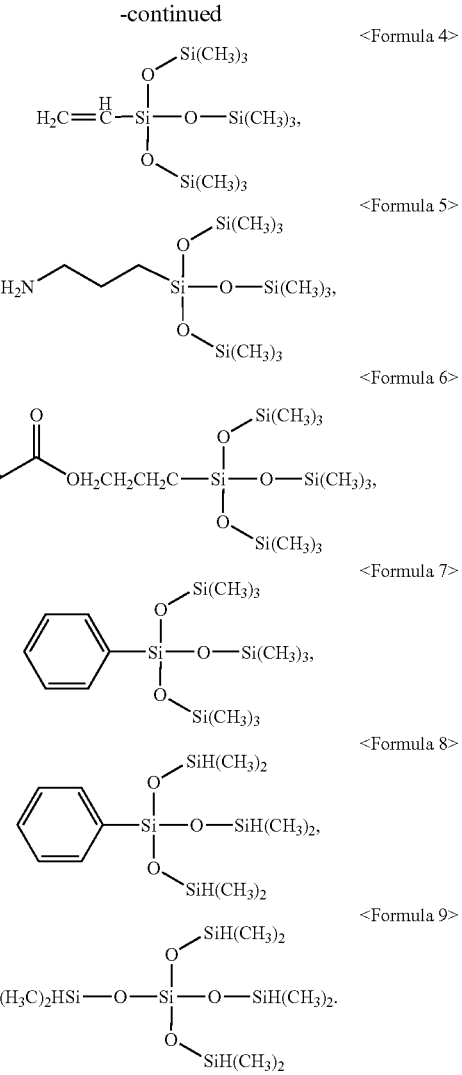

2. The ink composition of claim 1, wherein a content of the siloxy group-containing silane-based compound of Formula 1 is about 0.05 to 5 parts by weight based on 100 parts by weight of the ink composition.

3. The ink composition of claim 1, wherein a content of the colorant is about 0.5 to 15 parts by weight based on 100 parts by weight of the ink composition.

4. The ink composition of claim 1, wherein a content of the solvent is about 80 to 99 parts by weight based on 100 parts by weight of the ink composition.

5. The ink composition of claim 1, wherein the solvent is an aqueous solvent, an organic solvent, or a mixture thereof.

6. The ink composition of claim 5, wherein the organic solvent is at least one selected from a group consisting of a monohydric alcohol-based solvent, a ketone-based solvent, an ester-based solvent, a polyhydric alcohol-based solvent, a nitrogen-containing solvent, and a sulfur-containing compound.

7. The ink composition of claim 5, wherein the solvent comprises 100 parts by weight of the aqueous solvent and 0.1 to 130 parts by weight of the organic solvent.

8. The ink composition of claim 1, further comprising an additive.

9. The ink composition of claim 8, wherein the additive is at least one selected from a group consisting of a wetting agent, a dispersant, a surfactant, a viscosity modifier, a pH adjustor, and an antioxidant.

10. The ink composition of claim 1, having a surface tension of 15 to 70 dyne/cm at 20° C.

11. The ink composition of claim 1, having a viscosity of 1 to 20 cps at 20° C.

12. An ink set comprising two or more kinds of the ink composition of claim 1.

13. A cartridge for an inkjet recording apparatus, comprising the ink set of clam 12.

14. An inkjet recording apparatus comprising the cartridge of claim 13.

* * * * *